US012722173B2

(12) United States Patent
Moretti

(10) Patent No.: US 12,722,173 B2
(45) Date of Patent: Sep. 1, 2026

(54) DEVICE FOR DISPENSING A FLUID SUBSTANCE

(71) Applicant: LUMSON S.p.A., Capergnanica (IT)

(72) Inventor: Matteo Moretti, Crema (IT)

(73) Assignee: LUMSON S.p.A., Capergnanica (IT)

( * ) Notice: Subject to any disclaimer, the term of this patent is extended or adjusted under 35 U.S.C. 154(b) by 141 days.

(21) Appl. No.: 18/679,960

(22) Filed: May 31, 2024

(65) Prior Publication Data

US 2024/0399401 A1 Dec. 5, 2024

(30) Foreign Application Priority Data

May 31, 2023 (IT) ........................ 102023000011124

(51) Int. Cl.
*B05B 11/10* (2023.01)

(52) U.S. Cl.
CPC ................................ *B05B 11/1047* (2023.01)

(58) Field of Classification Search
CPC ............. B05B 11/1047; B05B 11/0054; B05B 11/0038; B05B 11/0013; B05B 11/0097; B05B 11/0032; B05B 11/028; B05B 11/1023; B05B 11/1069; B05B 11/1074; A45D 34/04; A45D 2200/051; A45D 2200/053; A45D 2200/056; A45D 40/26; A45D 2034/007; A45D 2040/0012; B65D 53/02; B65D 77/0493; B65D 83/76
See application file for complete search history.

(56) References Cited

U.S. PATENT DOCUMENTS 3,420,413 A * 1/1969 Corsette .............. B05B 11/0038 222/499
4,457,455 A * 7/1984 Meshberg ............. B05B 11/026 222/105
5,509,584 A * 4/1996 Gueret ................ B05B 11/1047 222/207
5,620,113 A * 4/1997 Meshberg ............. B05B 11/026 222/1
2010/0044393 A1* 2/2010 Moretti ................... B29C 49/24 222/105
2011/0024452 A1* 2/2011 Moretti ............... B05B 11/0054 222/105
2017/0128966 A1* 5/2017 Law .................... B05B 11/0027
2017/0197227 A1* 7/2017 Espinoza .............. F04B 53/144
(Continued)

FOREIGN PATENT DOCUMENTS

CN 114206748 A 3/2022
KR 102494299 B1 2/2023

*Primary Examiner* — Donnell A Long
(74) *Attorney, Agent, or Firm* — Dickinson Wright PLLC; Andrew D. Dorisio

(57) ABSTRACT

A fluid substance dispensing device includes an outer container endowed with a neck which determines a first opening and an inner container featuring a first flange which rests on a free surface of the neck and a second opening determined in proximity to the flange, an intermediate element which supports an atmospheric pump fastened to the intermediate element by a ring nut and equipped with removable means for connection with the neck of the outer container and with a flange portion resting on the flange of the inner container and of a skirt inserted tightly into the said second opening in the inner container, the skirt determining an outer conical contact surface with the inner container.

11 Claims, 4 Drawing Sheets

(56) References Cited

U.S. PATENT DOCUMENTS

| | | | | |
|---|---|---|---|---|
| 2018/0148236 | A1* | 5/2018 | Flood | B05B 11/1047 |
| 2019/0022681 | A1* | 1/2019 | Moretti | B05B 11/1047 |
| 2020/0360949 | A1* | 11/2020 | Knight | B05B 11/1047 |
| 2023/0013434 | A1* | 1/2023 | Kim | B05B 11/0013 |
| 2023/0022130 | A1* | 1/2023 | Lee | B65D 77/06 |
| 2023/0051362 | A1* | 2/2023 | Daigler | B05B 11/0081 |
| 2024/0025603 | A1* | 1/2024 | Paget | B65D 17/401 |
| 2025/0091784 | A1* | 3/2025 | Kobashi | B05B 11/0054 |

* cited by examiner

DEVICE FOR DISPENSING A FLUID SUBSTANCE

This application claims priority to Italian Patent Application for Invention No. 102023000011124 filed on May 31, 2023, the disclosure of which is incorporated by reference.

FIELD OF THE INVENTION

The present invention relates to a fluid substance dispensing device.

In particular, the said invention refers to a dispensing device equipped with an atmospheric pump.

STATE OF THE ART

There are commonly known fluid substance dispensing devices which can be refilled once the substance is used up.

However, refilling operations are often difficult for the end user, who does not have sophisticated control tools available to couple the various parts of the device in a stable, sealed manner.

This often results in an assembly that while appearing optimal, can cause malfunctions in the dispensing device or product leakage over time.

CN114206748-A, describes a dispensing device known in the art.

SUMMARY OF THE INVENTION

The object of the present invention is to provide a fluid substance dispensing device which is improved compared with the prior art.

A further object of the invention is to provide a device which is easily refillable by the end user even without special tools, is configured so as to guarantee correct operation, and does not leak even if it is refilled without precision tools.

This and other objects are achieved by means of a dispensing device according to the technical teachings of the claims appended hereto.

BRIEF DESCRIPTION OF THE FIGURES

Further features and advantages of the innovation will become clearer in the description of a preferred but not exclusive embodiment of the device, illustrated—by way of a non-limiting example—in the drawings appended hereto, in which.

DETAILED DESCRIPTION OF THE INVENTION

Figure 1:
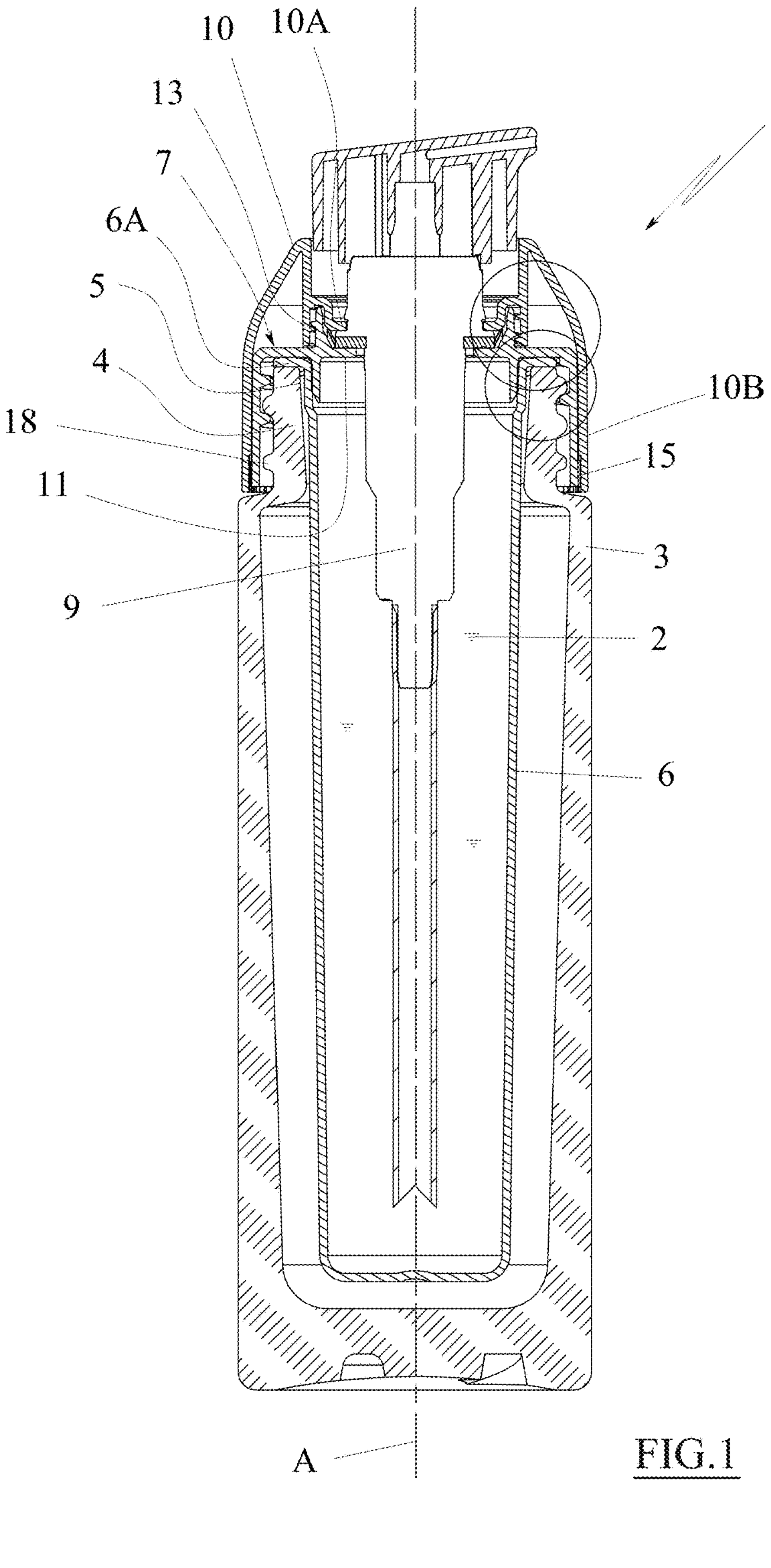
FIG. 1 is a sectional view of the device according to the present invention.

With reference to the figures stated, reference number 1 is used to denote, as a whole, a fluid substance dispensing device.

In this document, the term 'fluid substance' can mean a variably dense liquid, such as a cream, which is preferably used in the cosmetic or medical fields.

The device 1 for dispensing a fluid substance S comprises an outer container 3 equipped with a neck 4 which determines a first opening 5.

The outer container 3 is preferably made of glass, aluminium, or in any case of a premium material, which may also be decorated or screen-printed.

An inner container 6 is also featured, which can be made of a lower quality material than that of the outer container, preferably plastic.

The inner container 6 features a first flange 6A, which rests on a free surface of the said neck 4 and features a second opening (for pouring in the fluid substance) determined in proximity to the said flange 6A.

The said container is essentially inserted via the opening 5 in the outer container 3.

An intermediate element 7 is also featured, which supports an atmospheric pump 9 fastened to the intermediate element 7 by means of a ring nut 10 and is equipped with removable means for connection with the neck 4 of the outer container 3.

In practice, the intermediate element 7 can be coupled with the outer container 3 by means of a thread 16 which cooperates with a counter-thread 18 featured on the said neck 4.

For this purpose, the intermediate element 7 can be screwed onto and unscrewed from the outer container 3, or more precisely, to a neck 4 thereof. This operation is particularly useful during refilling operation by an end user, which will be described in detail later.

Figure 3:
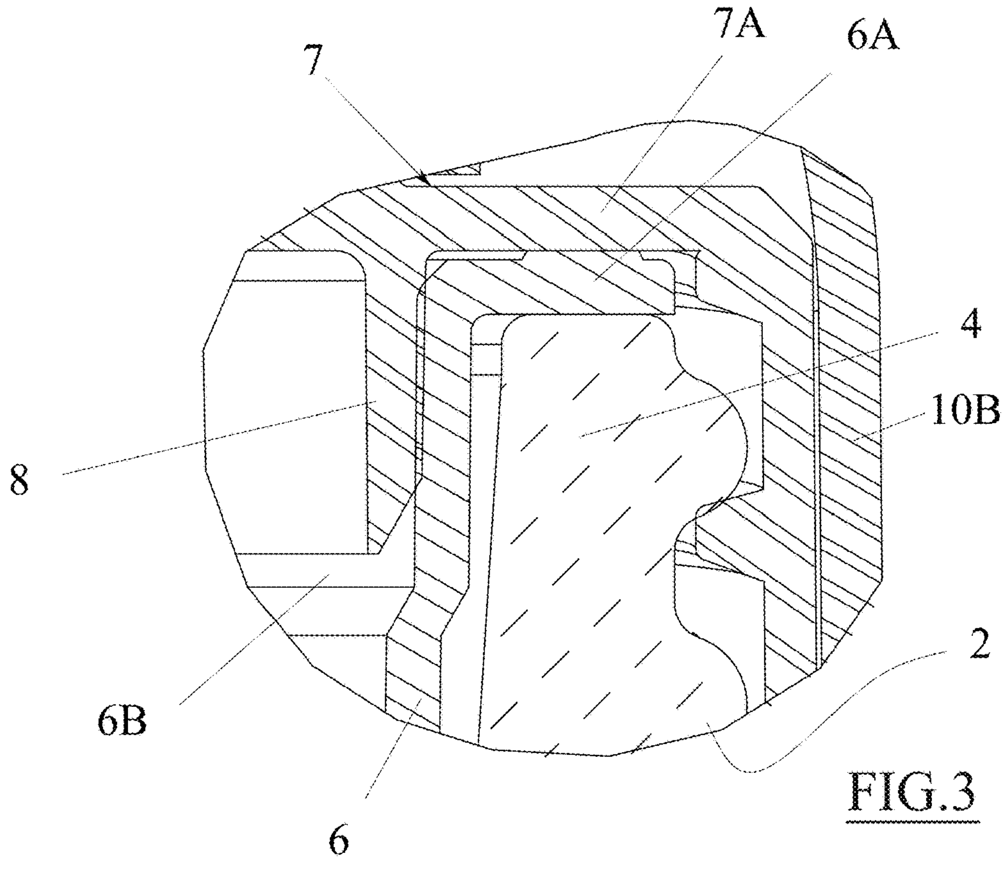
FIG. 3 is an enlargement of the part circled in the small circle in FIG. 1.

As clearly visible in the detail in FIG. 3, the intermediate element 7 is endowed with a flange portion 7A resting on the said flange 6A of the inner container 6.

The intermediate element 7 also has a skirt 8 inserted tightly into the said second opening in the inner container 6.

In practice, the skirt 8 determines a conical outer contact surface with the inner container 6, which creates a perfect seal regardless of the tightening torque applied (by hand) when fastening the intermediate element 7 onto the neck of the container.

This is particularly useful during refilling, where the end user tightens the element 7 by hand after replacing the inner container 6 with a: full one (after removing a removable protection film 20 where present on the new inner container 6).

During this closing operation, the user does not know the exact tightening torque required to secure the element 7 to the neck and essentially acts by hand-tightening the said element until they feel a tightness which they deem sufficient.

With the skirt 8 configured in this way, simple hand tightening is sufficient to prevent leakage and to ensure a perfect seal between the intermediate element 7 and the inner container 6.

Advantageously, the skirt 8 cooperates with a cylindrical portion 6B of the inner container 6, featured at the second opening.

The taper $\alpha$ of the peripheral surface of the skirt (FIG. 4) with respect to an axis A of the intermediate element 7, may be between 0.5 and 3°, preferably 1°.

Figure 4:
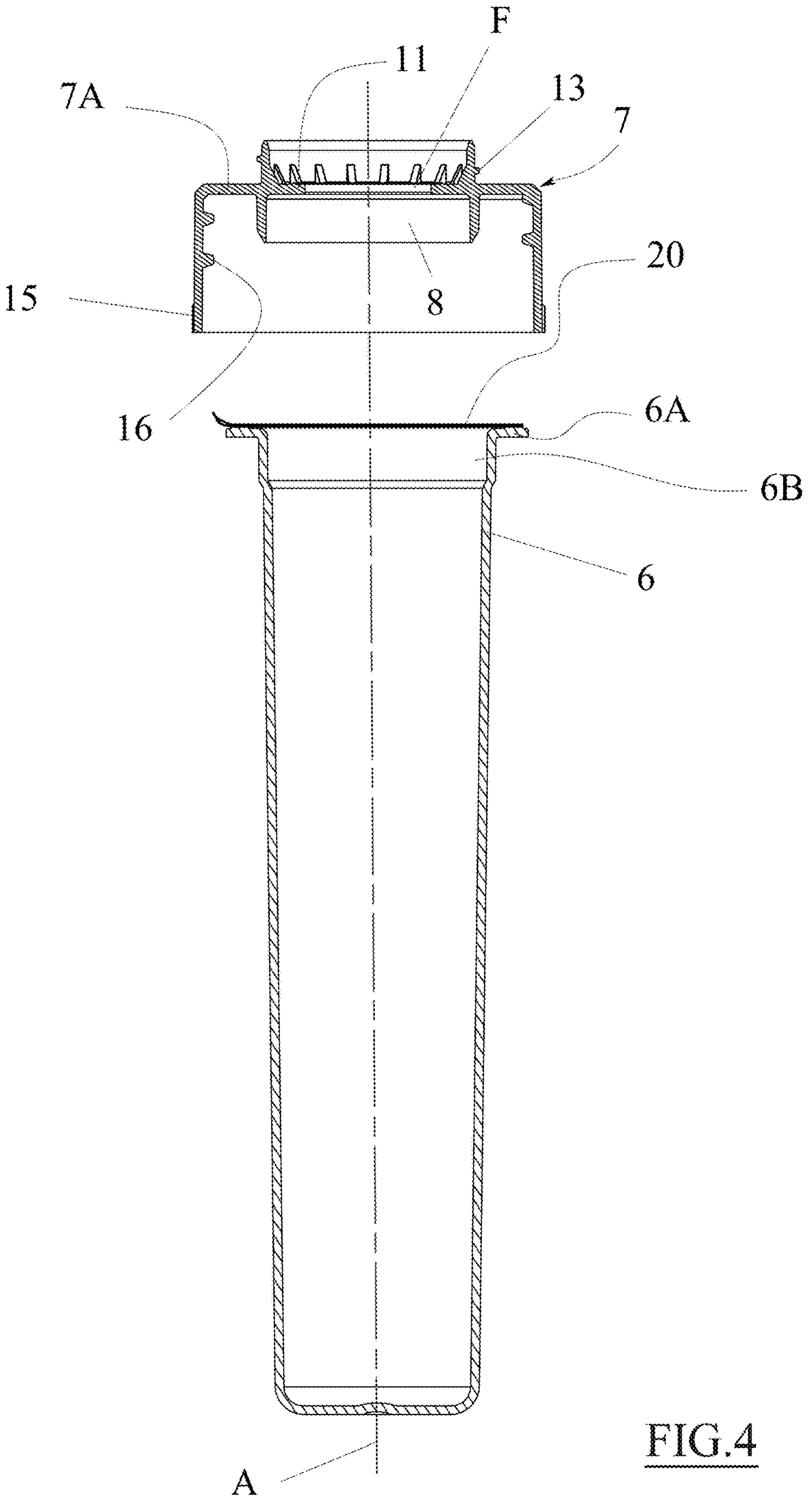
FIG. 4 is a schematic sectional view of two separate parts which fit together to seal the device in FIG. 1.
Figure 5:
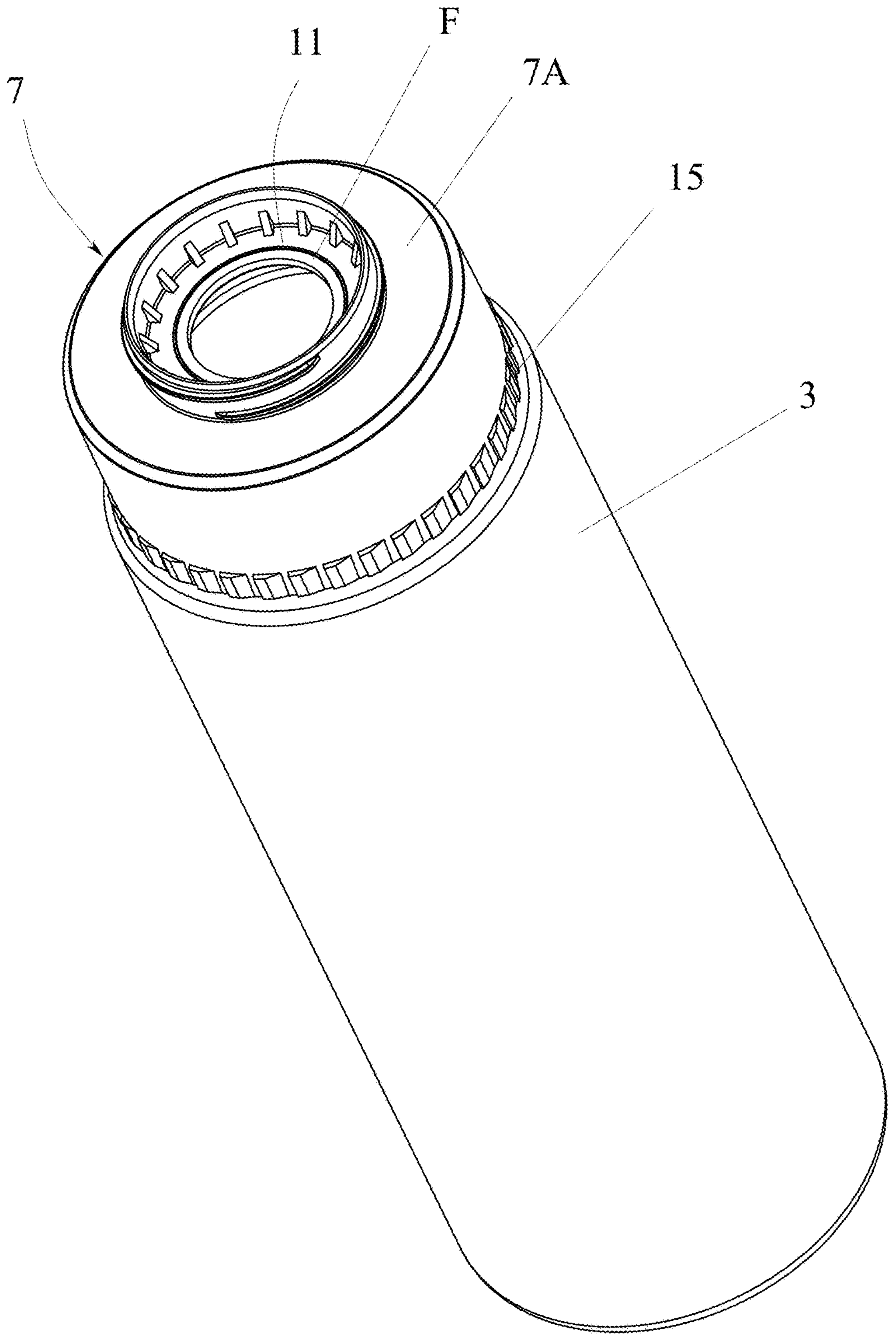
FIG. 5 is a perspective view of a part of the device in FIG. 1.

As also visible in FIG. 4, and in the section in FIG. 1, the intermediate element 7 can feature a wall 11 which determines a window F (in practice a circular hole) in which the pump 9 is housed.

Figure 2:
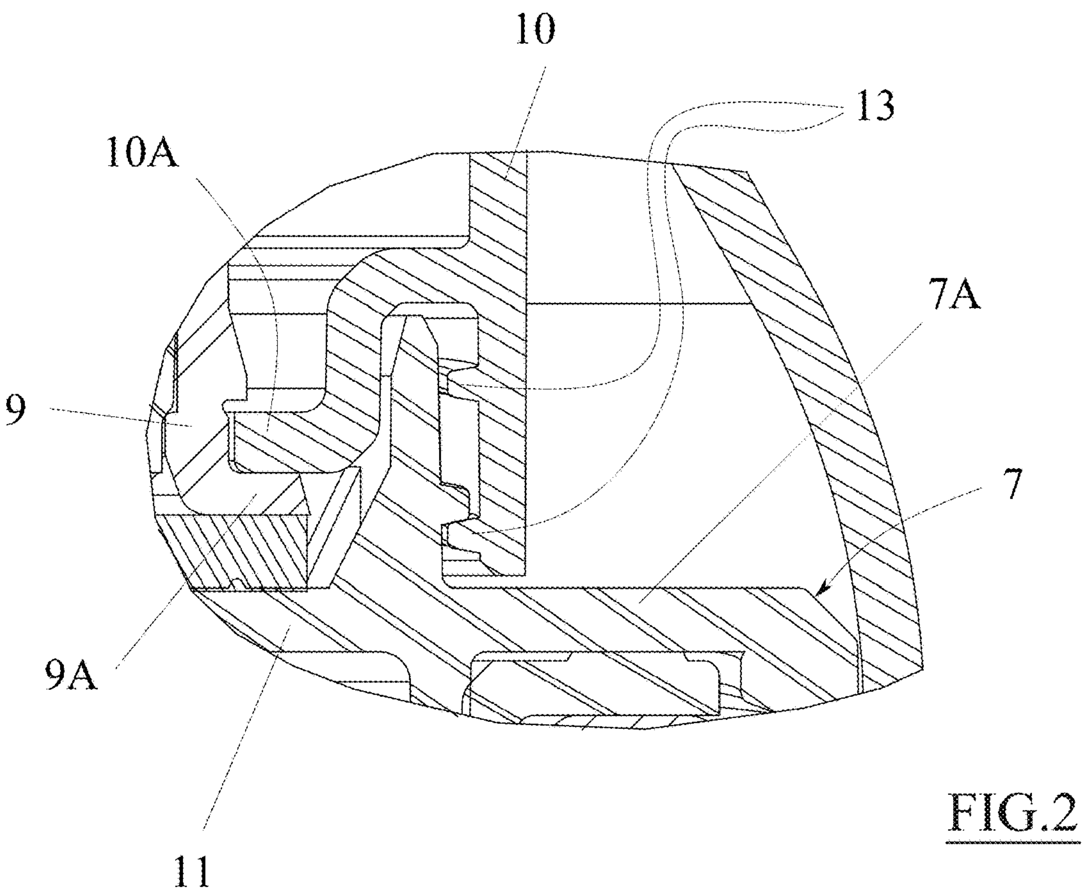
FIG. 2 is an enlargement of the part circled in the large circle in FIG. 1.

The ring nut 10 can determine a second flange 10A (FIG. 2), and the pump 9 can feature a third flange 9A sandwiched between the wall 11 with the hole and the second flange 10A.

Optionally, a gasket 12 can be featured between the said wall with a hole and the third flange 9A of the pump 9.

It should be underlined that, since the pump is an atmospheric model, the pump body can feature a passageway, for example positioned between the two piston lips.

The upward and downward movement of the pumping unit determines the exchange of air between the inside of the bottle and the areas located above the pump piston sealing area. This guarantees the suction, inside the inner container, of a quantity of air sufficient to compensate for the volume of substance dispensed by the pump.

Obviously, between the ring nut 10 and the intermediate element 7, snap or screw fastening means 13 can be featured, as well anti-rotation coupling means 15.

In this way, for operations to unscrew and screw the intermediate element 7 on the outer element 3, the user can act directly on the ring nut 10 externally.

For this purpose, the ring nut 10 can have a skirt 10B which surrounds the intermediate element 7 perimeterally, thereby concealing the said element. This configuration also has aesthetic purposes.

The said skirt 10B will be handled by the user during unscrewing and re-screwing operations.

Advantageously therefore, the aforesaid anti-rotation means 15 (or torsional coupling means) are featured, at least, on the said skirt 10B in proximity to a free end thereof. The said means are preferably positioned on the inner side of the skirt 10B.

Said means 15 may comprise, for example, a first grooved profile provided on the internal side of the skirt 10B that matches with a correspondent second grooved profile provided on the outer perimeter of the intermediate element 7.

This positioning of the anti-rotation means maximises the torque transmitted to the intermediate element 7 (acting on the skirt 10B).

It should be noted that the configuration of the anti-rotation means may depend on the type of coupling provided between the inner element 7 and the ring nut 10. If the coupling provides snap-fastening means, the anti-rotation means may block the rotation of the ring nut 10 (with respect to the inner element) both in clockwise and anti-clockwise direction.

If the coupling provides screw fastening means 13, the anti-rotation means 15 may allow the rotation of the ring nut 10 over the inner element up to a complete coupling of the screw fastening, and then block the rotation of the ring nut 10 over the inner element both clockwise and anti-clockwise.

To end the description, it must be underlined that the wall 11 can extend coplanarly to the said first flange 7A (as is visible in FIG. 4) and the skirt 8 can extend from an end portion of the said flange 7A located at the said wall 11.

Various embodiments of the innovation have been disclosed herein, but further embodiments may also be conceived using the same innovative concept.

The invention claimed is:

1. A dispensing device (1) of a fluid substance (2) comprising an outer container (3) provided with a neck (4) defining a first opening (5), and an inner container (6), the inner container (6) presenting a first flange (6A) resting on a free surface of said neck (4) and a second opening defined near said flange (6A), an intermediate element (7) supporting an atmospheric pump (9) attached to the intermediate element (7) by means of a ring nut (10) and having removable means of connection with the neck (4) of the outer container (3) and a flange portion (7A) that rests on said flange (6A) of the inner container (6) and a skirt (8) inserted into said second opening (6B) of the inner container (6), the skirt (8) defining a conical outer contact surface with the inner container (6), between the ring nut (10) and the intermediate element (7) snap or screw coupling means (13) and anti-rotation coupling means (15) are provided.

2. The device according to claim 1, wherein the intermediate element (7) provides a wall (11) defining a window (F) in which the pump (9) is housed, the ring nut (10) defining a second flange (10A), the pump (9) providing a third flange (9A) sandwiched between the wall (11) and the second flange (10A).

3. The device according to claim 2, further including a gasket provided between said wall (11) and the third flange (9A) of the pump (9).

4. The device according to claim 2, wherein the wall (11) extends coplanar to said first flange (7A) and the skirt (8) extends from an end portion of said flange (7A) located at said wall (11).

5. The device according to claim 1, wherein the ring nut (10) has a skirt (10B) that perimeterally surrounds the intermediate element (7) hiding it from view.

6. The device according to claim 5, wherein said anti-rotation means (15) are at least made on said skirt (10B) near a free end thereof.

7. The device according to claim 1, wherein said intermediate element (7) is connected with the outer container (6) via a thread (16) cooperating with a counter-thread (18) made on said neck (4).

8. The device according to claim 1, wherein the skirt (8) cooperates with a cylindrical portion (6B) of the inner container (6).

9. The device according to claim 1, wherein the inner container (6) provides a protective film (20) that is removable before it is used as a refill of a device (1) that has already dispensed all of the substance(S).

10. The device according to claim 1, wherein a taper ($\alpha$) of the outer surface of the skirt (8) with respect to an axis (A) of the intermediate element (7), is between 0.5 and 3°.

11. The device according to claim 1, wherein a taper ($\alpha$) of the outer surface of the skirt (8) with respect to an axis (A) of the intermediate element (7), is 1°.

* * * * *